Jan. 2, 1923.
R. H. HASSLER.
SHOCK ABSORBING DEVICE FOR VEHICLES.
FILED JUNE 17, 1921.
1,440,829.
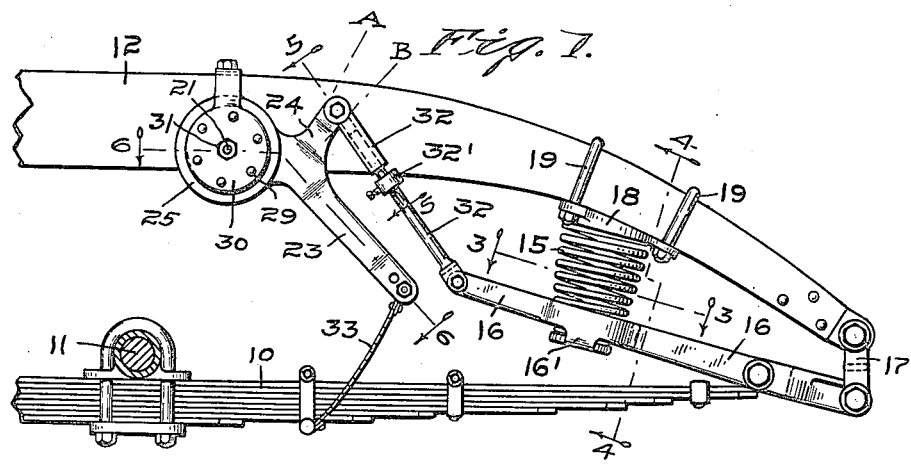
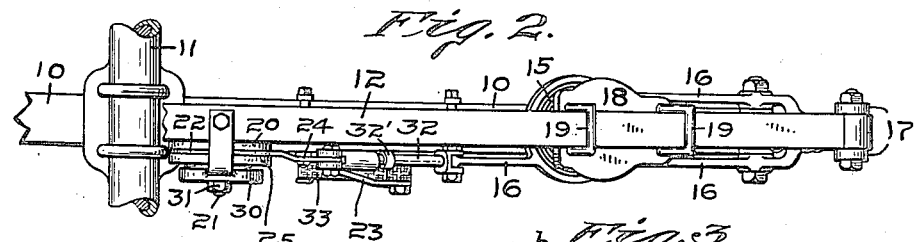
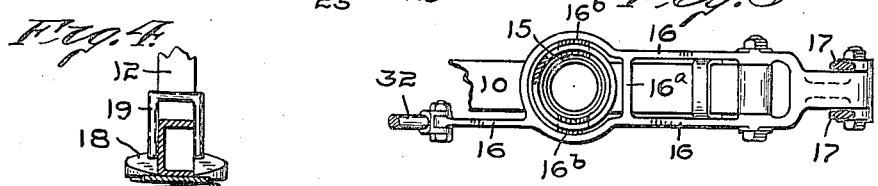
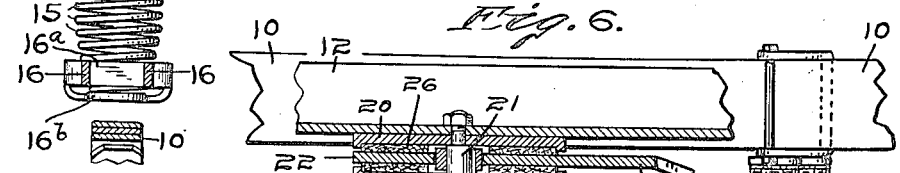
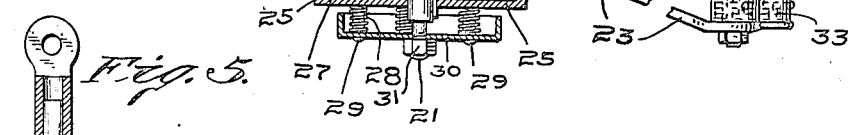
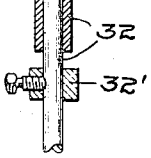
INVENTOR:
Robert H. Hassler,
By Frank W. Woerner,
ATTORNEY.

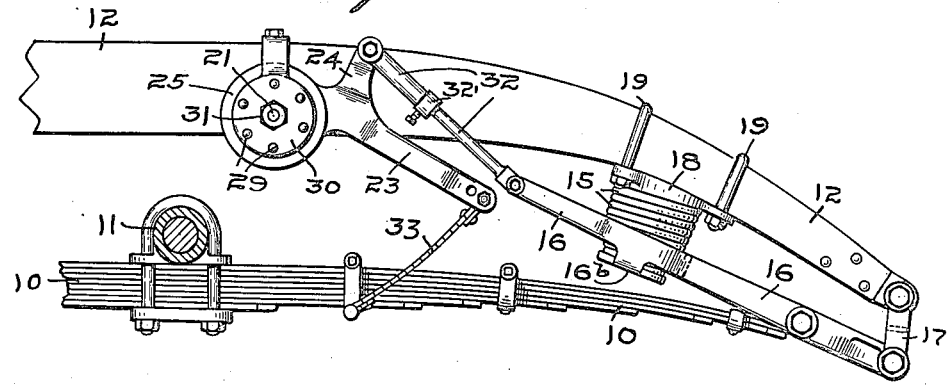
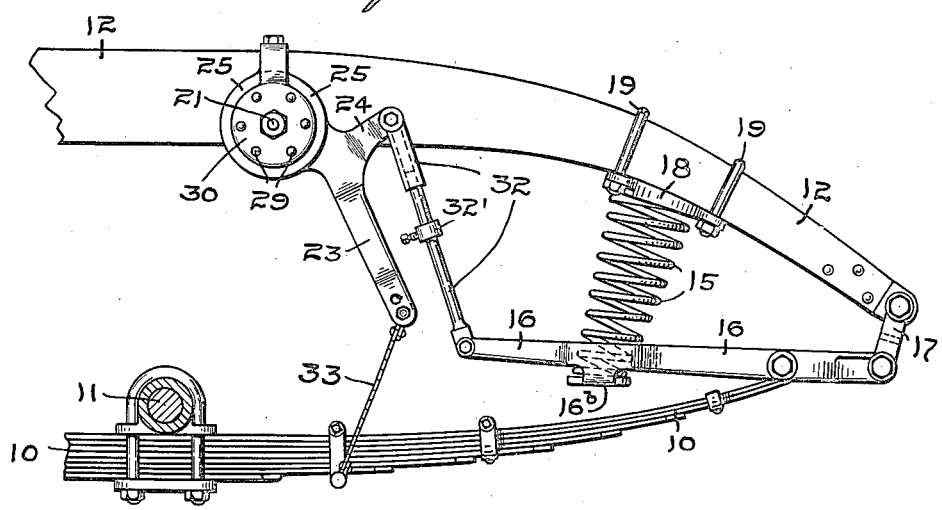

Patented Jan. 2, 1923.

1,440,829

UNITED STATES PATENT OFFICE.

ROBERT H. HASSLER, OF INDIANAPOLIS, INDIANA.

SHOCK-ABSORBING DEVICE FOR VEHICLES.

Application filed June 17, 1921. Serial No. 478,237.

*To all whom it may concern:*

Be it known that I, ROBERT H. HASSLER, a citizen of the United States, residing at Indianapolis, in the county of Marion and State of Indiana, have invented certain new and useful Improvements in Shock-Absorbing Devices for Vehicles, of which the following is a specification.

This invention relates to a system of vehicle springs and shock absorbers—being a specific form of the invention more broadly claimed in my pending application filed May 16, 1921, Serial No. 470,121—which coact with one another to produce conditions of easy-riding under all circumstances of road travel and under variable conditions of vehicle-loading.

It is well understood by automobile engineers that stiff damping forces are needed on vehicle springs when road conditions impose violent oscillations of long period or of relatively slow movement, and that such damping forces are very objectionable when the road conditions set up small oscillations of short rapid character.

The principal object of my present invention is to provide a shock absorber of a retarding or damping type, which will act very effectually on the vehicle springs at times when such action is most needed, and which will be inactive at times when damping action is not absolutely necessary or desired.

I accomplish the above objects of the invention, and such others as may appear from a perusal of the following description, by means of one of my preferred embodiments, illustrated in the accompanying drawings, forming a part hereof, in which—

Figure 1 is a side elevation showing the various parts of one form of my invention under normal load position. Fig. 2 is a top or plan view of the construction shown in Fig. 1. Fig. 3 is a fragmentary detail horizontal view, partly in plan and partly in section, on the plane 3—3 in Fig. 1. Fig. 4 is a vertical cross section, on the plane 4—4 in Fig. 1. Fig. 5 is a fragmentary detail vertical sectional view, on an enlarged scale, on the plane 5—5 in Fig. 1. Fig. 6 is a cross sectional view, on an enlarged scale, of the friction device, on the plane 6—6 in Fig. 1. Fig. 7 is a view similar to Fig. 1, except that the parts are shown in position when subjected to violent compressive shocks. Fig. 8 is a view similar to Fig. 7, except that the parts are shown in extreme position of rebound.

Referring to the drawings, 10 is the main or leaf spring which is secured intermediate its ends to the axle 11 of the vehicle. 12 is the vehicle frame member. The adjacent ends of the main spring 10 and the member 12 are connected together by means of a lever 16, the latter being connected at a point intermediate its ends to the adjacent eye-end of the main spring 10 and the outer end of the lever being connected to the end of frame member 12 by means of the shackles 17. As shown in the plan view of Fig. 3, lever 16 is formed a part of its length of a pair of side members which are united by means of the ribs $16^a$, and lever 16 is further provided at an intermediate portion, preferably between its point of connection with main spring 10 and the free end of the lever, with a web $16^b$ which forms a seat for the lower end of a supplemental spring 15, the upper end of the latter spring bearing against a spring-seat 18 which is rigidly secured to frame member 12 by means of bolts 19.

To control the action of the organization under excessive recoil or rebound movements of the vehicle parts, so as to minimize the danger and disagreeable effects of such movements, I provide a checking or damping device which is preferably carried by the frame member 12. This damping device contemplates the use of a circular base-plate or disk 20 which is securely bolted to frame member 12 by means of a central stud 21. Stud 21 also supports a tilting-lever which forms a part of the damping device. This tilting-lever comprises a disk portion 22 having connected therewith the arms 23 and 24. Disk portion 22 of the tilting-lever is held out of direct contact with the base-plate 20 and an outer pressure plate 25 by means of the friction disks 26 and 27 which contact the sides of disk 22, which friction disks are also carried by stud 21. Pressure is applied to cause the friction disks 26 and 27 to frictionally engage the adjacent surfaces of disk portion 22 of the tilting-lever by means of a plurality of springs 28 which are arranged concentrically around stud 21 and bear against the outer surface of pressure plate 25. These springs are held in operative position by means of the pins 29 which are mounted in a cap 30 which slips over the end of stud 21, said cap being susceptible of movement on said stud so as to increase or decrease the compression on the springs 28 by means of a nut 31. Arm 24 of the tilting-lever of the damping device is connected directly to the adjacent end of lever 16 by means of a connector link 32 so that when the movement of the vehicle parts exceeds a predetermined magnitude under major compressive shocks—when the vehicle parts are moved toward each other into the position shown in Fig. 7—the upward movement of lever 16 is of sufficient range to oscillate the tilting-lever from its normal position shown in Fig. 1 to that shown in Fig. 7. This last mentioned movement of the parts sets the damping device so that its checking or damping effectiveness becomes immediately available in yieldably restraining the movement of rebound of the vehicle parts 10 and 12. To permit a predetermined latitude of movement of the vehicle parts before imparting any action to the damping device, I form connector link 32 of two members which are slidably connected together, as shown in Fig. 1, and by means of a collar 32', which is adjustably mounted on one of said members, the vehicle parts are free to move within certain prescribed limits before collar 32' is brought into contact with the adjacent end of the overlapping member of the connector link, and before the slack is removed from the flexible element 33 which connects arm 23 of the tilting-lever directly with the main spring 10.

The load of the vehicle is carried by the frame member 12 through the supplemental spring 15, lever 16, shackle 17 and main spring 10 to the axle 11.

In considering the operation of the various parts and the peculiar advantages sought to be obtained by my invention, it is desirable first to consider the parts in the normal load position, as shown in Fig. 1 of the drawings. In this view the parts are approximately in the position they would assume when the vehicle is being driven over smooth road surfaces, during which time the main and supplemental springs 10 and 15 are not unduly flexed in either direction from the above mentioned position by the minor stresses imposed by small obstacles and depressions in the road surface. Under this condition, the main spring 10 and supplemental spring 15 are not damped by the damping device, but, on the contrary, are left free to absorb all of the small vibrations a major part of the time. This makes the car ride extremely easy over city streets, or where the roadway presents small-sized obstacles or depressions. The above results are obtained for the reason that the range of movement of lever 16 is so slight as to not exceed the free sliding movement of the lost motion connector link or overcome the amount of slack in flexible element 33. When however the vehicle wheels strike a large-sized obstacle or depression, the effect of such abnormal shock will move the parts into the position shown in Fig. 7, wherein the main spring 10 is either straightened out or bowed downwardly, and the supplemental spring 15 is compressed in the manner as shown in said figure. Owing to this compression of the supplemental spring 15, lever 16 is tilted so that its inner end moves upwardly a predetermined distance before imposing any action on the damping device, or until collar 32' comes into contact with the end of the telescopic member of the connector link 32, after which said tilting-lever is moved coincident with the continued upward travel of the end of said lever 16. This movement of the tilting-lever is sufficient, or substantially so, to practically remove the slack from flexible element 33. As soon as the parts have reached the limit of their movement under compressive shocks, the natural tendency of the resilient suspension system is to recede or recoil immediately toward normal position, which movement may be sufficiently violent to carry said parts beyond the normal position, and is well-known to disagreeably affect the pleasures of motor travel. The position of the parts of my invention at the extreme limit of this rebound or upthrow, is illustrated in Fig. 8. As the damping device was set and the flexible element 33 practically straightened out under compressive movement of the vehicle parts, it will be observed that as soon as the parts recede from their compressed position, the movement of separation of the main spring 10 and vehicle member 12 will immediately exert, through flexible element 33, a downward pull on arm 23 of the tilting-lever, so that the retarding effect of the damping device is immediately brought into play to check and restrain too rapid recoil movement or separation of the main spring 10 and frame member 12. During this action the main spring may become bowed upwardly in excess to its free unloaded form, while the supplemental spring 15 is correspondingly extended. This extension of the supplemental spring at the time of rebound of the parts, moves the adjacent end of lever 16 downwardly without exerting any pulling force on the damping device by reason of the telescopic connection formed between the members of the connector link 32.

Fig. 1 illustrates the parts in their normal or static load position—under the normal loading of the vehicle—in which the spring or springs play somewhat on each side of this position without actuating the retarding device. I am aware that previous automobile manufacturers have used retarding devices having a neutral or non-acting position. Such previous devices have always had what may be called a fixed neutral point. In the movements of body and axle members, this neutral point has always been fixed at the same relative position of the said members; and this was an objectionable feature, because the neutral point could be adjusted only for one load condition of the vehicle. If the neutral point was set or adjusted for medium vehicle loads, then at light loads the body was floating too high to secure the advantage or effect of the neutral point setting of the retarding device; while at heavy loads, the body floated too low to secure the best results of the fixed setting of the restraining mechanism.

In my present invention, I attain the above mentioned new, novel and useful feature of a retarding device in which the neutral or non-acting position automatically follows and continually adjusts itself to the loading of the vehicle body.

At light loads, the first slight oscillations of the body and subsequent pull and push movements of the connector link 32 and flexible element 33 on the tilting-lever will cause the latter to take a position somewhere near the dotted line A and to play in an angular range line approximately to such line.

When the body is heavily loaded the first few push and pull movements of the connector link 32 and flexible element 33, will cause the tilting-lever to take up a position near the dotted line B and to play near such angular line. Of course at all times, the tilting-lever will depart from such positions when the movements of the axle or body elements exceed a predetermined range of travel; but for all small oscillatory movements the neutral position of the damping device will be unaffected.

My method of obtaining this neutral effect has advantages not possessed by previously used forms, for the reason that with my arrangement the retarding or damping device is inactive at times when such damping effect is not needed, so that the wear on the parts of said device and its connections is correspondingly reduced. This feature of having the entire retarding or damping device standing idle when it is not needed, adds greatly to the durability of the parts, including its connections, thereby correspondingly reducing the noise and rattle incident to wear and looseness of such parts.

The foregoing description is merely illustrative of the principles of my invention, and other modifications thereof may be made that will function in substantially the same manner without departing from the spirit of my invention, and I do not, therefore, desire to limit myself to the use of any specific form of the parts illustrated.

Having thus fully described my said invention, what I claim as new and desire to secure by Letters Patent, is—

1. A resilient suspension system for vehicles which comprises the combination of a vehicle frame member, a main spring, a lever supported by said frame member, means for connecting the main spring to an intermediate portion of the lever, a supplemental spring interposed between the lever and the frame member, a friction device having a pair of radial oscillating arms arranged on one side of its axis, a one-way connector comprising a pair of telescopic members for connecting one of the arms of the friction device and the lever together, and a flexible one-way connector for connecting the other arm of the friction device with the main spring.

2. A resilient suspension system for vehicles which comprises the combination of a vehicle frame member, a main spring, a lever supported by the frame member, means for connecting the end of the main spring to an intermediate portion of the lever, a supplemental spring interposed between the lever and the frame member, a friction device having a pair of oscillating arms arranged on one side of its axis, a one-way connector comprising a pair of telescopic members for connecting one of the arms of the friction device and lever together, means for varying the relative movements of the members of the connector, and a flexible one-way connector for connecting the other arm of the friction device with the main spring.

In witness whereof, I, have hereunto set my hand and seal at Indianapolis, Indiana, this 14th day of June, A. D., one thousand nine hundred and twenty-one.

ROBERT H. HASSLER. [L. S.]